US007549414B2

(12) United States Patent
Moriya

(10) Patent No.: US 7,549,414 B2
(45) Date of Patent: Jun. 23, 2009

(54) CONTROL DEVICE FOR INTERNAL COMBUSTION ENGINE AND AIR-FUEL RATIO CALCULATION METHOD

(75) Inventor: Hidenori Moriya, Susono-shi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 187 days.

(21) Appl. No.: 11/719,654

(22) PCT Filed: Nov. 18, 2005

(86) PCT No.: PCT/JP2005/021626

§ 371 (c)(1), (2), (4) Date: May 18, 2007

(87) PCT Pub. No.: WO2006/054790

PCT Pub. Date: May 26, 2006

(65) Prior Publication Data

US 2008/0195294 A1 Aug. 14, 2008

(30) Foreign Application Priority Data

Nov. 18, 2004 (JP) ............................ 2004-334892

(51) Int. Cl.
*F02D 41/00* (2006.01)
*B60T 7/12* (2006.01)

(52) U.S. Cl. ........................ 123/678; 123/435; 701/103

(58) Field of Classification Search ................. 123/677, 123/678, 679, 434, 435, 568, 406.41; 701/103, 701/114

See application file for complete search history.

(56) References Cited

U.S. PATENT DOCUMENTS 4,860,707 A * 8/1989 Ohata ...................... 123/339.2
6,564,556 B2 * 5/2003 Ginter ......................... 60/775
6,879,904 B2 * 4/2005 Muto et al. ................. 701/108
7,182,066 B2 * 2/2007 Goya et al. ................. 123/435
7,200,486 B2 * 4/2007 Tanaka et al. ............... 701/109

(Continued)

FOREIGN PATENT DOCUMENTS

JP 5 59986 3/1993

(Continued)

OTHER PUBLICATIONS

Tunestal, P. et al."Cylinder Air/Fuel Ratio Estimation Using Net Heat Release Data",Control Engineering Practice, vol. 11, No. 3, pp. 311-318, 2003.

*Primary Examiner*—John T Kwon
(74) *Attorney, Agent, or Firm*—Oblon, Spivak, McClelland, Maier & Neustadt, P.C.

(57) ABSTRACT

An internal combustion engine (1), which generates power by burning a mixture of fuel and air in each combustion chamber (3), is provided with an in-cylinder pressure sensor (15) that is located in the combustion chamber (3) for detecting an in-cylinder pressure, and an ECU (20). ECU (20) calculates a heat quantity of air $Q_{air}$ in the combustion chamber (3) and a heat generation quantity of fuel $Q_{fuel}$ provided into the combustion chamber (3), based upon the in-cylinder pressure detected by the in-cylinder pressure sensor (15) and calculates an air-fuel ratio AF in the combustion chamber (3) based upon the heat generation quantity $Q_{fuel}$ of the fuel and the heat quantity of the air $Q_{air}$.

15 Claims, 7 Drawing Sheets

U.S. PATENT DOCUMENTS

| | | | | |
|---|---|---|---|---|
| 2006/0224296 | A1 * | 10/2006 | Goya et al. | 701/102 |

FOREIGN PATENT DOCUMENTS

| | | |
|---|---|---|
| JP | 11 148410 | 6/1999 |
| JP | 2000 513788 | 10/2000 |
| JP | 2001 55952 | 2/2001 |
| JP | 2004 100567 | 4/2004 |
| JP | 2004 108600 | 4/2004 |
| JP | 2005 207407 | 8/2005 |

* cited by examiner

CONTROL DEVICE FOR INTERNAL COMBUSTION ENGINE AND AIR-FUEL RATIO CALCULATION METHOD

TECHNICAL FIELD

The present invention relates to a control apparatus and method for air-fuel ratio calculation for an internal combustion engine which generates power by burning a mixture of fuel and air in a combustion chamber.

BACKGROUND ART

There is conventionally known a control apparatus for an internal combustion engine which estimates an air-fuel ratio in a combustion chamber based upon a ratio of an in-cylinder pressure detected at the timing as 60 degrees before TDC to an in-cylinder pressure at the timing as 60 degrees after TDC (for example, refer to Japanese Patent Laid Open No. JP-5-59986A). The control apparatus for the internal combustion engine is provided with a table for defining correlation between a ratio of the in-cylinder pressures and an air-fuel ratio in the combustion chamber for each engine operating condition to read out the air-fuel ratio corresponding to the ratio of the in-cylinder pressures from the table.

However, it is not easy to define, in detail and accuracy, correlation between a ratio of the in-cylinder pressures between two prescribed points and an air-fuel ratio in the combustion chamber for each engine operating condition. From this respect, it is difficult to actually apply the conventional control apparatus to the internal combustion engine.

Therefore, it is an object of the present invention to provide a control apparatus and method for air-fuel ratio calculation for an internal combustion engine in practical use which is capable of highly accurately detecting an air-fuel ratio in a combustion chamber.

DISCLOSURE OF THE INVENTION

A control apparatus for an internal combustion engine according to an aspect of the present invention is characterized in that a control apparatus for an internal combustion engine which generates power by burning a mixture of fuel and air in a combustion chamber comprises in-cylinder pressure detecting means for detecting an in-cylinder pressure in a combustion chamber, in-cylinder energy calculating means for calculating a heat quantity in the combustion chamber based upon the in-cylinder pressure detected by the in-cylinder pressure detecting means, and air-fuel ratio determining means for determining an air-fuel ratio in the combustion chamber based upon the heat quantity calculated by the in-cylinder energy calculating means.

In this case, it is preferable that the in-cylinder energy calculating means calculates the heat quantity based upon the in-cylinder pressure detected by the in-cylinder pressure detecting means and an in-cylinder volume at the time of detecting the in-cylinder pressure.

In addition, it is preferable that the in-cylinder energy calculating means for calculating the heat quantity based upon a product of the in-cylinder pressure detected by the in-cylinder pressure detecting means and a value made by an in-cylinder volume at the time of detecting the in-cylinder pressure raised to a predetermined exponent.

Further, the in-cylinder energy calculating means may calculate a heat quantity of air aspired into the combustion chamber and a heat generation quantity by combustion of fuel provided to the combustion chamber and the air-fuel ratio determining means may determine an air-fuel ratio in the combustion chamber based upon the heat quantity of the air and the heat generation quantity of the fuel calculated by the in-cylinder energy calculating means.

In this case, it is preferable that the in-cylinder energy calculating means calculates a heat quantity of air based upon a deviation between two prescribed points during an intake stroke in a product of the in-cylinder pressure detected by the in-cylinder detecting means and a value made by the in-cylinder volume at a detecting timing of the in-cylinder pressure raised to a predetermined exponent, and it is preferable that the in-cylinder energy calculating means calculates a heat generation quantity of fuel based upon a deviation between two prescribed points for a period from combustion start to substantial combustion completion in a product of the in-cylinder pressure detected by the in-cylinder detecting means and a value made by the in-cylinder volume at the detecting timing of the in-cylinder pressure raised to a predetermined exponent.

In addition, it is preferable that the in-cylinder energy calculating means calculates a heat quantity by combustion of fuel provided to the combustion chamber when an air-fuel ratio in the combustion chamber is set greater than a theoretical air-fuel ratio, and the air-fuel ratio determining means determines the air-fuel ratio in the combustion chamber based upon a heat generation quantity by combustion of fuel calculated by the in-cylinder energy calculating means and a quantity of fuel provided to the combustion chamber.

Further, it is preferable that the in-cylinder energy calculating means calculates a heat generation quantity by combustion of fuel provided to the combustion chamber when an air-fuel ratio at the combustion chamber is set smaller than a theoretical air-fuel ratio, and the air-fuel ratio determining means determines an air-fuel ratio in the combustion chamber based upon the heat generation quantity by combustion of fuel calculated by the in-cylinder energy calculating means and a quantity of air aspired into the combustion chamber.

In addition, it is preferable that the control apparatus for the internal combustion engine according to the present invention is further equipped with corrective means that calculates a predetermined corrective value in such a manner that an air-fuel ratio calculated by the air-fuel ratio determining means corresponds to a preset target air-fuel ratio.

An air-fuel ratio calculating method for an internal combustion engine according to the present invention includes in-cylinder pressure detecting means for detecting an in-cylinder pressure in a combustion chamber, and generates power by burning a mixture of fuel and air in a combustion chamber comprises:

(a) a step of calculating a heat quantity in the combustion chamber based on the in-cylinder pressure detected by the in-cylinder pressure detecting means; and (b) a step of calculating an air-fuel ratio in the combustion chamber based upon the heat quantity calculated in the step (a).

In this case, it is preferable that the heat quantity is calculated based upon the in-cylinder pressure detected by the in-cylinder detecting means and the in-cylinder volume at the detecting time of the in-cylinder pressure in the step (a).

Further, it is preferable that in the step (a), the heat quantity is calculated based upon a product of the in-cylinder pressure detected by the in-cylinder pressure detecting means and a value made by the in-cylinder volume at the detecting time of the in-cylinder pressure raised to a predetermined exponent.

And, in the step (a) a heat quantity of air aspired into the combustion chamber and a heat generation quantity by combustion of fuel provided to the combustion chamber may be calculated, and in the step (b) an air-fuel ratio in the combustion chamber may be determined based upon the heat quantity of air and a heat generation quantity by combustion of fuel calculated in the step (a).

In this case, it is preferable that in the step (a) a heat quantity of air is calculated based upon a deviation between two prescribed points during an intake stroke in a product of the in-cylinder pressure detected by the in-cylinder detecting means and a value made by the in-cylinder volume at detecting timing of the in-cylinder pressure raised to a predetermined exponent, and it is preferable that in the step (a) a heat generation quantity of fuel is calculated based upon a deviation between two prescribed points for a period from combustion start to substantial combustion completion in a product of the in-cylinder pressure detected by the in-cylinder detecting means and a value made by the in-cylinder volume at the detecting timing of the in-cylinder pressure raised to a predetermined exponent.

In addition, it is preferable that when the air-fuel ratio in the combustion chamber is set greater than a theoretical air-fuel ratio, in the step (a) the heat generation quantity by combustion of fuel provided to the combustion chamber is calculated and in the step (b) an air-fuel ratio in the combustion chamber is determined based upon the heat generation quantity by combustion of the fuel calculated in the step (a) and the quantity of the fuel provided to the combustion chamber.

Further, it is preferable that when the air-fuel ratio in the combustion chamber is set smaller than a theoretical air-fuel ratio, in the step (a) the heat generation quantity by combustion of the fuel provided to the combustion chamber is calculated and in the step (b) an air-fuel ratio at the combustion chamber is determined based upon the heat generation quantity by combustion of the fuel calculated in the step (a) and a quantity of air aspired into the combustion chamber.

BEST MODE FOR CARRYING OUT THE INVENTION

The inventors have studied for realizing a practical apparatus and method for enabling an accurate detection of an air-fuel ratio in a combustion chamber. The inventors have resulted in focusing attention on a heat quantity in a combustion chamber, specifically, a heat quantity of air aspired into a combustion chamber and a heat generation quantity by combustion of fuel provided to the combustion chamber. In more details, a mass of the air aspired into the combustion chamber or amass of the fuel provided to the combustion chamber can be obtained by dividing a heat quantity in the combustion chamber calculated for a predetermined time by a low-level heat quantity of air or fuel.

Thus, calculating the heat quantity in the combustion engine enables an accurate calculation of an air-fuel ratio that is a mass ratio between air and fuel in the combustion engine based on the heat quantity.

Specifically, when a heat quantity of air aspired into the combustion chamber is set as $Q_{air}$ and a heat quantity generated by the combustion of fuel provided to the combustion chamber is set as $Q_{fuel}$, and a low-level heat generation quantity of air is set as $q_{air}$, and a low-level heat generation quantity of fuel vaporized in the combustion chamber is set as $q_{fuel}$, an air-fuel ratio AF in the combustion chamber is shown as the following expression (1) based on the heat quantity of air $Q_{air}$ and the heat generation quantity of fuel $Q_{fuel}$;

$$AF=Q_{air}/q_{air}/Q_{fuel}/q_{fuel} \tag{1}$$

Figure 1:
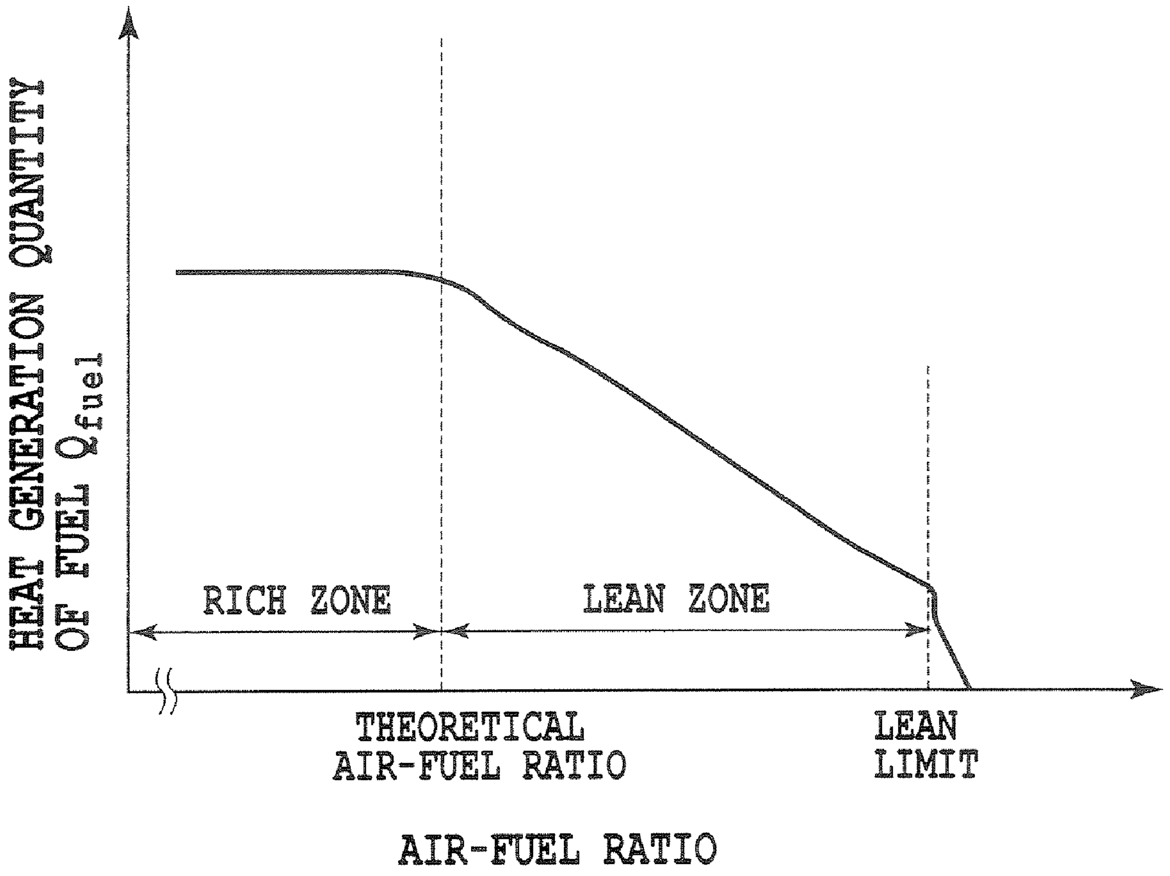
FIG. 1 is a graph showing a correlation between a heat generation quantity by combustion of fuel provided to a combustion chamber and an air-fuel ratio of a mixture in the combustion chamber.

The correlation is acknowledged between a heat generation quantity by combustion of fuel $Q_{fuel}$ provided to the combustion chamber and an air-fuel ratio of a mixture in the combustion chamber, as shown in FIG. 1.

Accordingly, in the range where an air-fuel ratio of a mixture in the combustion chamber is smaller than a theoretical air-fuel ratio (a rich zone), a change of a heat generation quantity by combustion of fuel $Q_{fuel}$ is minute, and a heat generation quantity of fuel $Q_{fuel}$ is hardly changed, even if the air-fuel ratio is changed. On the other hand, when the air-fuel ratio of the mixture in the combustion chamber becomes greater than a theoretical air-fuel ratio and goes into a lean zone, the heat generation quantity of the fuel $Q_{fuel}$ decreases to a so-called lean limit generally in proportion to the air-fuel ratio. Thus, by using a correlation between a heat generation quantity of fuel $Q_{fuel}$ and an air-fuel ratio in the combustion chamber as shown in FIG. 1, an air-fuel ratio in a combustion chamber may be calculated as follows.

Figure 2:
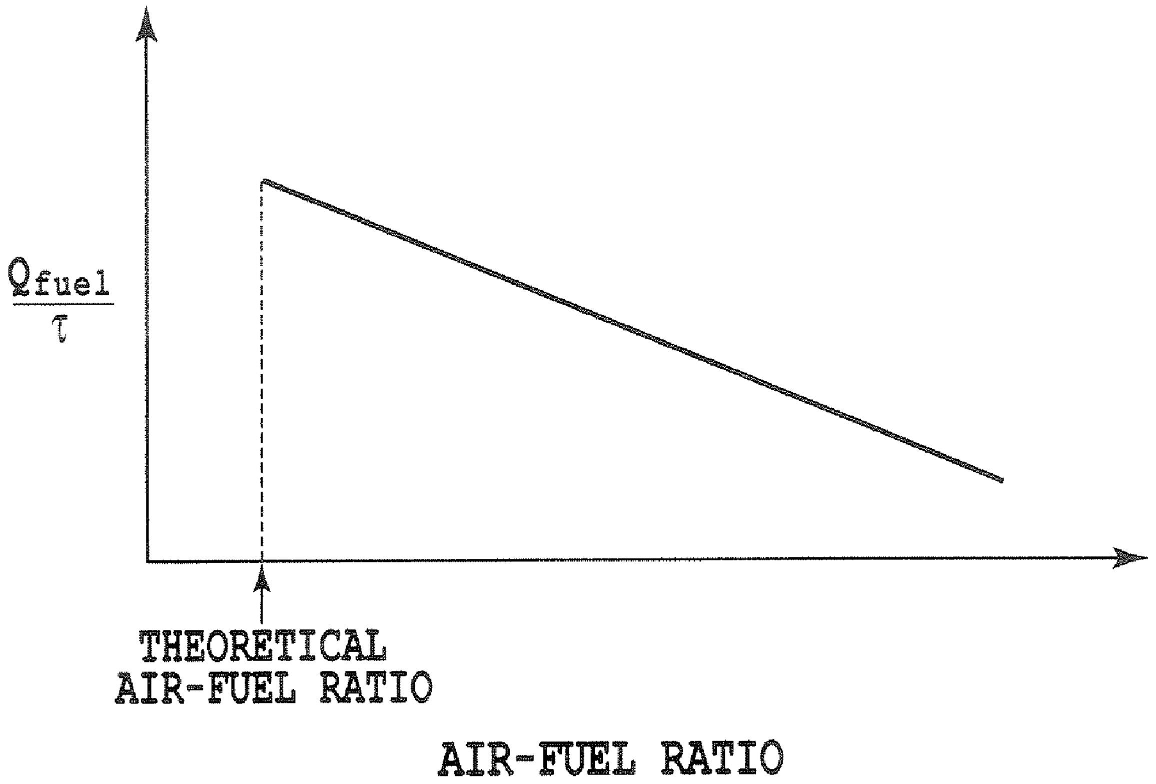
FIG. 2 is a graph showing a correlation in a lean zone between a value obtained by normalizing a heat generation quantity by combustion of fuel by the fuel providing time, and an air-fuel ratio in a combustion chamber.

Specifically, in a lean zone where a heat generation quantity by combustion of fuel $Q_{fuel}$ is proportionate mostly to an air-fuel ratio (refer to FIG. 1), if a heat generation quantity by combustion of fuel $Q_{fuel}$ is divided for normalization by fuel injection time $\tau$ (fuel supply time), which corresponds to a quantity of fuel provided to a combustion chamber, a correlation is formed between a value $Q_{fuel}/\tau$ and an air-fuel ratio of a mixture in the combustion chamber as shown in FIG. 2 regardless of a load of an internal combustion engine, and the value $Q_{fuel}/\tau$ decreases generally in proportion to an air-fuel ratio in a lean zone. Thus, when an air-fuel ratio in a combustion chamber is set greater (lean value) than a theoretical air-fuel ratio, an air-fuel ratio AF in a combustion chamber may be calculated from the following expression (2) based upon a heat generation quantity of fuel $Q_{fuel}$ provided to a combustion chamber and the fuel injection time $\tau$ corresponding to a quantity of fuel provided to the combustion chamber. In addition, $A_L$ and $C_L$ in the expression (2) are constants that may be determined experimentally, and $\epsilon$ is a heat generation quantity conversion coefficient that may be theoretically determined regarding fuel.

$$AF = \frac{Q_{air}/q_{air}}{Q_{fuel}/q_{fuel}} = A_L \cdot \varepsilon \cdot \frac{Q_{fuel}}{\tau} + C_L \tag{2}$$

Figure 3:
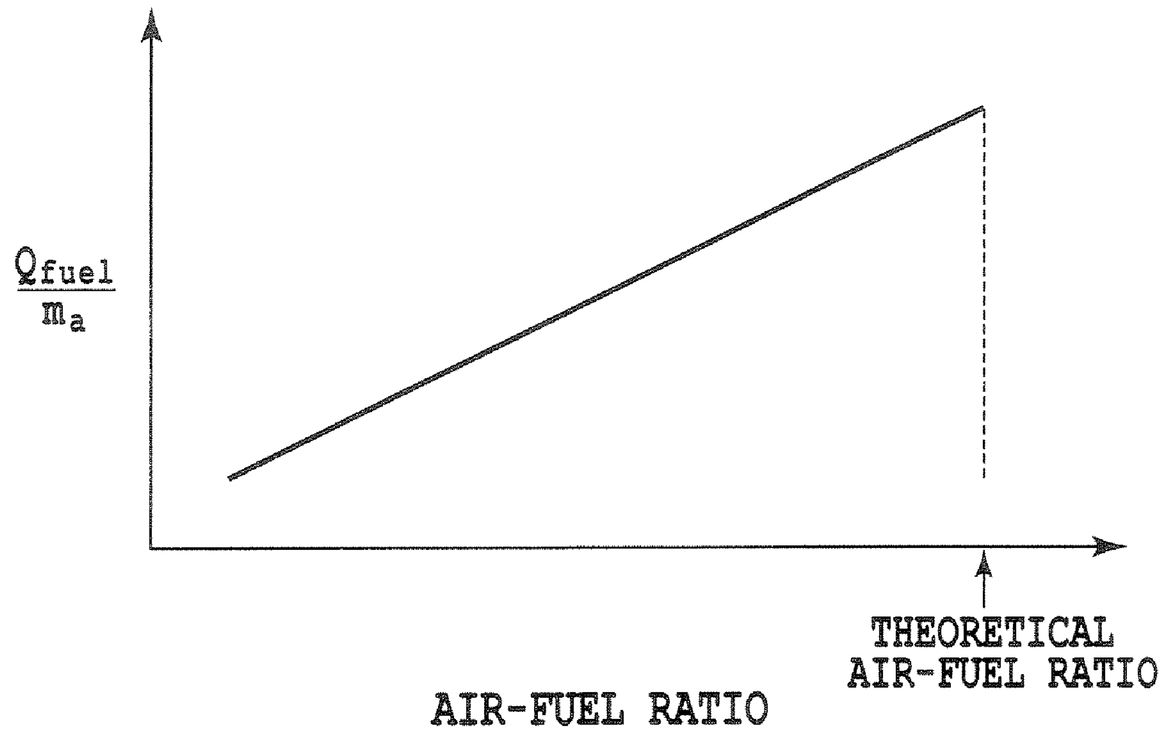
FIG. 3 is a graph showing a correlation in a rich zone between a value obtained by normalizing a heat generation quantity by combustion of fuel by an intake air quantity, and an air-fuel ratio in the combustion chamber.

On the other hand, in a rich zone where a heat generation quantity by combustion of fuel $Q_{fuel}$ is generally constant regardless of an air-fuel ratio (refer to FIG. 1), if a heat generation quantity of fuel $Q_{fuel}$ is divided by an intake air quantity into a combustion chamber $m_a$ for normalization, a correlation as shown in FIG. 3, is formed between a value $Q_{fuel}/m_a$ and a air-fuel ratio of a mixture in a combustion chamber regardless of a load of a internal combustion engine, and a value $Q_{fuel}/m_a$ increase generally in proportion to an air-fuel ratio in a lean zone. Thus, when an air-fuel ration in a combustion chamber is set smaller (rich value) than a theoretical air-fuel ratio, an air-fuel ratio AF in a combustion chamber may be calculated from the following expression (3) based upon a heat generation quantity of fuel $Q_{fuel}$ provided to a combustion chamber and a quantity of air aspired into a combustion chamber $m_a$. In addition, $A_R$ and $C_R$ in the expression (3) are constants that may be determined experimentally, and d is a heat generation quantity conversion coefficient that may be theoretically determined regarding air.

$$AF = \frac{Q_{air}/q_{air}}{Q_{fuel}/q_{fuel}} = A_R \cdot \delta \cdot \frac{Q_{fuel}}{m_a} + C_R \tag{3}$$

Thus, it becomes possible to obtain a correlation, which doesn't depend on a load, of the normalized value of a heat generation quantity of fuel $Q_{fuel}$ and an air-fuel ratio in each of a lean zone and a rich zone, by normalizing a heat generation quantity of fuel $Q_{fuel}$ in a lean zone and a rich zone, as well as by using a correlation between a heat generation quantity by combustion of fuel provided to a combustion chamber $Q_{fuel}$ and an air-fuel ratio of a mixture in a combustion chamber. As a result, an air-fuel ratio can be accurately obtained from such correlation in each of the lean zone and the rich zone.

In addition, by using the above expression (2) and (3), it is possible to reduce the calculation loads upon calculating the air-fuel ratio, since only a heat generation quantity of fuel $Q_{fuel}$ needs to be calculated but not a heat quantity of air $Q_{air}$.

As described above, by using the above expression (1) or (2) and (3), it becomes possible to calculate an air-fuel ratio in a combustion chamber accurately based upon a heat quantity in a combustion chamber, and still the inventors have studied for enabling reduction of the calculation loads upon calculating a heat quantity in a combustion chamber.

Assuming that an in-cylinder pressure detected by the in-cylinder pressure detecting means at a crank angle of θ is set as P(θ), an in-cylinder volume at a crank angle of θ (at the time of detecting the in-cylinder pressure P(θ) is set as V(θ), and a specific heat ratio is set as κ, the inventors have resulted in focusing attention on a product $P(\theta)\cdot V^{\kappa}(\theta)$ (hereinafter referred to as $PV^{\kappa}$ properly) obtained as a product of an in-cylinder pressure P(θ) and a value $V^{\kappa}(\theta)$ determined by exponentiating the in-cylinder volume V(θ) with a specific heat ratio κ (a predetermined index number).

Figure 4:
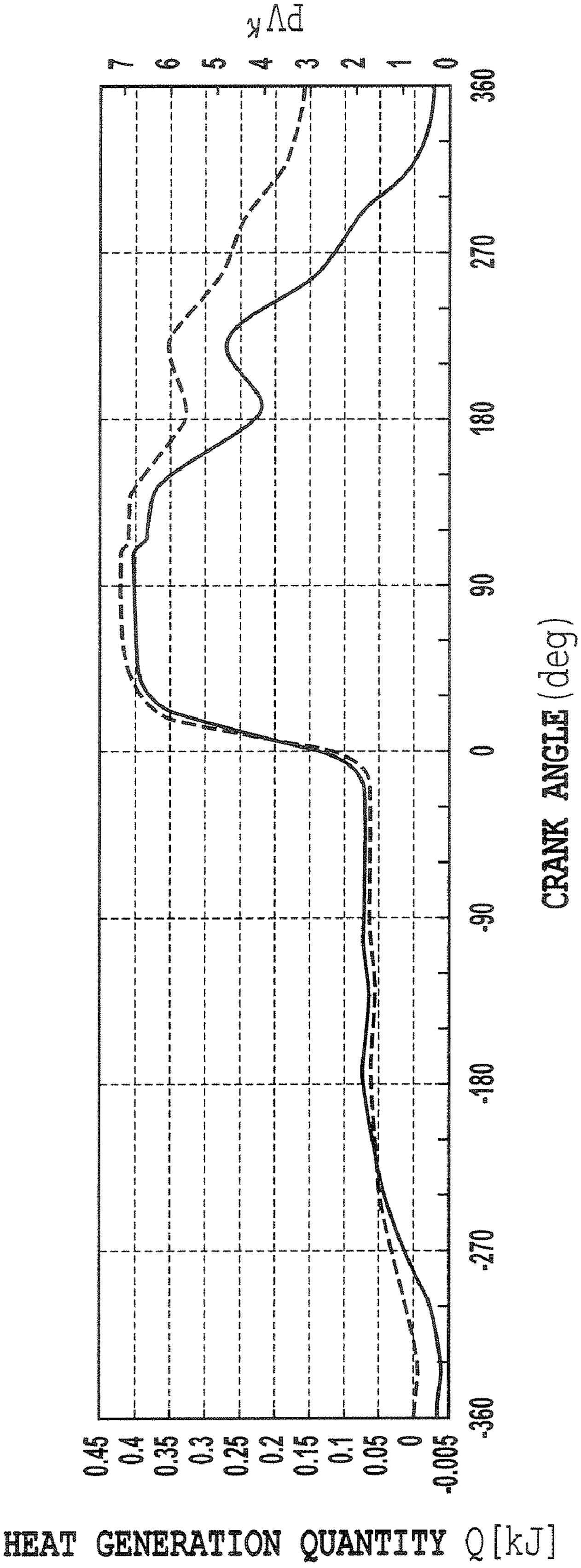
FIG. 4 is a graph showing a correlation between a product $PV^{\kappa}$ used in the present invention and a heat generation quantity in a combustion chamber.

In addition, the inventors have found out that there is a correlation, as shown in FIG. 4, between a changing pattern of a heat generation quantity Q in a combustion chamber for an internal combustion engine to a crank angle and a changing pattern of a product $PV^{\kappa}$ to a crank angle.

In FIG. 4, a solid line is produced by plotting a product $PV^{\kappa}$ of an in-cylinder pressure in a predetermined model cylinder detected for every predetermined minute crank angle and a value obtained by exponentiating an in-cylinder volume at the time of detecting the in-cylinder pressure with a predetermined specific heat ratio κ. In addition, in FIG. 4, a dotted line is produced by calculating and plotting a heat generation quantity Q in the model cylinder based upon the following expression (4) as $Q=\int dQ/d\theta\cdot\Delta\theta$. It should be noted that in any case κ=1.32 for simplicity. It also should be noted that in FIG. 4, −360°, 0°, and 360° respectively correspond to a top dead center, and −180° and 180° respectively correspond to a bottom dead center.

$$\frac{dQ}{d\theta} = \left\{\frac{dP}{d\theta}\cdot V + k\cdot P\cdot\frac{dV}{d\theta}\right\}\cdot\frac{1}{k-1} \tag{4}$$

As seen from the result shown in FIG. 4, a changing pattern of a heat generation quantity Q to a crank angle is generally equal (similar) to a changing pattern of a product $PV^{\kappa}$ to a crank angle.

Especially, in the proximity of combustion start (at spark ignition timing for a gasoline engine, or compression ignition timing for a diesel engine) of a mixture in cylinder (e.g. a range from −180° to 135° in FIG. 4), a changing pattern of a heat generation quantity Q is extremely equal to a changing pattern of a product $PV^{\kappa}$.

Herein, in FIG. 4, a difference in a product $PV^{\kappa}$ between two predetermined points shows a heat quantity in a combustion chamber between the two points. Therefore, when a crank angle at opening timing of an intake valve upon starting an intake stroke or at the timing when an exchange of energy in a combustion chamber becomes zero (at the timing when a heat generation ratio becomes zero: dQ/dθ=0 during an intake stroke) is set as $\theta_1$, and a crank angle at closing timing of an intake valve for completing an intake stroke is set as $\theta_2$, a heat quantity $Q_{air}$ of an air aspired into a combustion chamber can be calculated from the following expression (5). $\alpha_A$ in the expression (5) is a constant that is determined experimentally.

$$\begin{aligned} Q_{air} &= Q_{\theta 1}^{\theta 2} \\ &= \int_{\theta 1}^{\theta 2} \frac{dQ}{d\theta}\cdot\Delta\theta \\ &= a_A \times \{P(\theta_2)\cdot V^K(\theta_2) - P(\theta_1)\cdot V^K(\theta_1)\} \end{aligned} \tag{5}$$

Similarly, when a crank angle at a spark or ignition timing is set as $\theta_3$, and a crank angle at a substantial combustion completion timing (including a timing when an energy exchange in a combustion chamber becomes zero during an expansion stroke, i.e. a timing when a heat generation ratio becomes zero during an expansion process: dQ/dθ=0) is set as $\theta_4$, a heat generation quantity by combustion of fuel $Q_{fuel}$ can be calculated from the following expression (6). $\alpha_F$ in the expression (6) is a constant that is calculated experimentally.

$$\begin{aligned} Q_{fuel} &= Q_{\theta 3}^{\theta 4} \\ &= \int_{\theta 3}^{\theta 4} \frac{dQ}{d\theta}\cdot\Delta\theta \\ &= a_F \times \{P(\theta_4)\cdot V^K(\theta_4) - P(\theta_3)\cdot V_K(\theta_3)\} \end{aligned} \tag{6}$$

Accordingly, by using correlation between a heat generation quantity Q in a combustion chamber and a product $PV^{\kappa}$, that has been found by the inventors, it is possible to accurately calculate a heat quantity of air aspired into a combustion chamber $Q_{air}$ and a heat generation quantity by combustion of fuel provided to a combustion chamber $Q_{fuel}$ based upon a product $PV^{\kappa}$ with quite low loads.

The best mode for carrying out the present invention will be hereinafter explained in detail with reference to the drawings.

Figure 5:
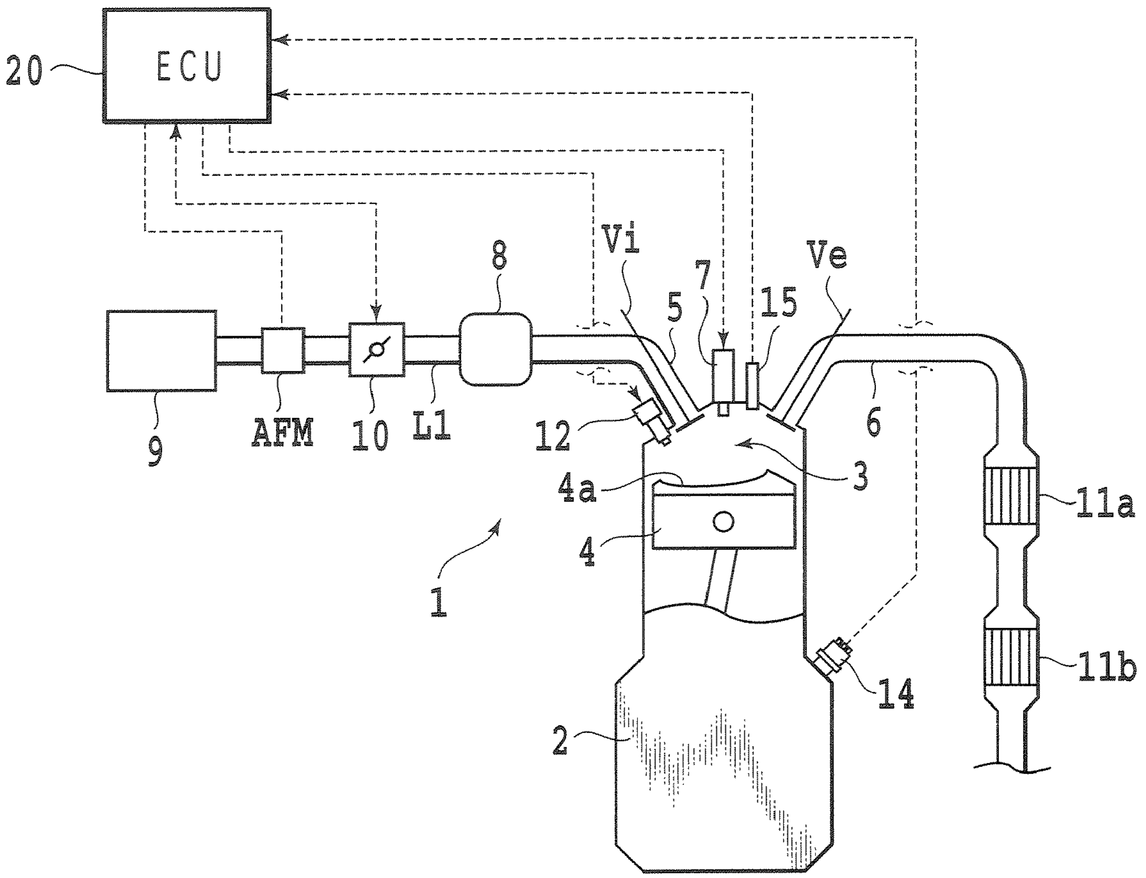
FIG. 5 is a schematic construction view of an internal combustion engine to which the control apparatus according to the present invention is applied.

FIG. 5 is a schematic construction view showing an internal combustion engine according to the present invention. An internal combustion engine 1 shown in the same figure burns a mixture of fuel and air inside a combustion chamber 3 formed in a cylinder block 2 and reciprocates a piston 4 inside the combustion chamber 3 to produce power. While FIG. 5 shows only one-cylinder, the internal combustion engine 1 is preferably constructed of a multi-cylinder engine and the internal combustion engine 1 in the present embodiment is constructed of, for example, a four-cylinder engine.

An intake port of each combustion chamber 3 is respectively connected to an intake pipe (intake manifold) 5 and an exhaust port of each combustion chamber 3 is respectively connected to an exhaust pipe (exhaust manifold) 6. In addition, an intake valve Vi, which opens/closes an intake port, and an exhaust valve Ve, which opens/closes an exhaust port, are disposed for each chamber 3 in a cylinder head of the internal combustion engine 1. Each intake valve Vi and each exhaust valve Ve are activated by, for example, a valve operating mechanism (not shown) including a variable valve timing function. Further, the internal combustion engine 1 is provided with ignition plugs 7, the number of which corresponds to the number of the cylinders, and the ignition plug 7 is disposed in the cylinder head for exposure to the associated combustion chamber 3.

The intake manifold 5 is, as shown in FIG. 5, connected to a surge tank 8. An air supply line L1 is connected to the surge tank 8 and is connected to an air inlet (not shown) via an air cleaner 9. A throttle valve 10 (electronically controlled throttle valve in the present embodiment) is incorporated in the halfway of the air supply line L1 (between the surge tank 8 and the air cleaner 9).

On the other hand, a pre-catalyst device 11*a* including a three-way catalyst and a post-catalyst device 11*b* including NOx occlusion reduction catalyst are, as shown in FIG. 5, connected to the exhaust manifold 6.

Further, the internal combustion engine 1 is provided with a plurality of injectors 12, each of which is, as shown in FIG. 5, disposed in the cylinder head for exposure to the associated combustion chamber 3. And each piston 4 of the internal combustion engine 1 is constructed in a so-called deep-dish top shape, and the upper face thereof is provided with a concave portion 4a. In addition, fuel such as gasoline is directly injected from each injector 12 toward the concave portion 4*a* of the piston 4 inside each combustion chamber 3 in a state air is being aspired into each combustion chamber 3 in the internal combustion engine 1. As a result, in the internal combustion engine 1, a layer of a fuel-air mixture in the vicinity of the ignition plug 7 is formed (stratified) to be separated from an air layer in the circumference of the mixture layer, and therefore, it is possible to perform stable stratified combustion with an extremely lean mixture. It should be noted that while the internal combustion engine 1 of the present embodiment is explained as a so-called direct injection engine, it goes without saying that the present invention is not limited thereto and may be applied to an internal combustion engine of an intake manifold (intake port) injection type.

Each ignition plug 7, the throttle valve 10, each injector 12, the valve operating mechanism and the like as described above are connected electrically to an ECU 20 which acts as a control apparatus of the internal combustion engine 1. The ECU 20 contains a CPU, a ROM, a RAM, an input and an output port, a memory apparatus and the like (any of them is not shown). Various types of sensors including an air flow meter AFM and a crank angle sensor 14 of the internal combustion engine 1 are, as shown in FIG. 5, connected electrically to the ECU 20. The ECU 20 controls the ignition plugs 7, the throttle valve 10, the injectors 12, the valve operating mechanism and the like for a desired output based upon use of various types of maps stored in the memory apparatus, as well as detection values of the various types of sensors or the like.

In addition, the internal combustion engine 1 includes in-cylinder pressure sensors 15 (in-cylinder pressure detecting means) the number of which corresponds to the number of the cylinders, each provided with a semiconductor element, a piezoelectric element, a fiber optical sensing element or the like. Each in-cylinder pressure sensor 15 is disposed in the cylinder head in such a way that the pressure-receiving face thereof is exposed to the associated combustion chamber 3 and is connected electrically to the ECU 20. Each in-cylinder pressure sensor 15 detects an in-cylinder pressure in the associated combustion chamber 3 to supply a signal showing the detection value to the ECU 20. The detected value of the in-cylinder pressure sensor 15 is provided to ECU 20 sequentially every predetermined time (predetermined crank angle), and adjusted by an absolute pressure, then stored and held within a predetermined memory region (buffer) of ECU 20 by a predetermined quantity.

Next, calculation procedure of an air-fuel ratio in each combustion chamber 3 for the internal combustion engine 1 will be explained with reference to FIG. 6.

Figure 6:
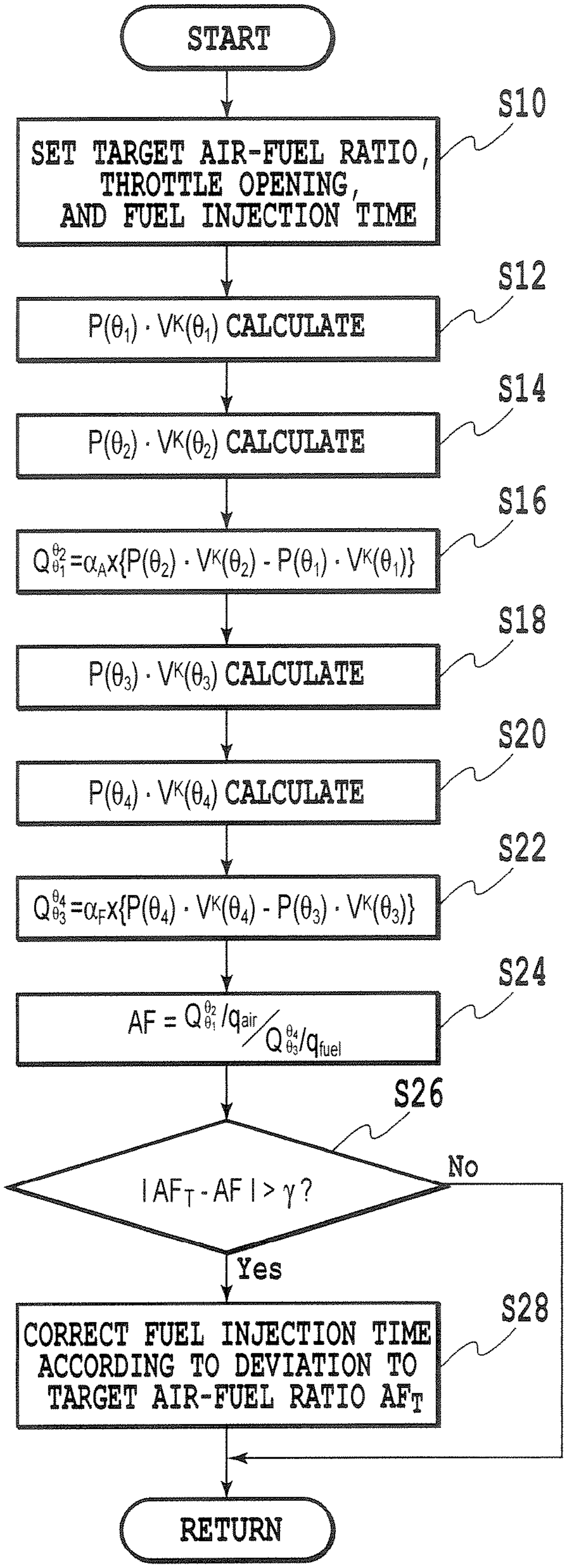
FIG. 6 is a flow chart for explaining an air-fuel ratio calculating routine executed in the internal combustion engine in FIG. 5.

When the internal combustion engine 1 is started, ECU 20, as shown in FIG. 6 executes a calculation routine of an air-fuel ratio repeatedly in each combustion chamber 3. That is, when the idling state is shifted to the idling-off state after the internal combustion engine 1 is started, ECU 20 determines a target torque and a target air-fuel ratio $AF_T$ of the internal combustion engine 1 based upon a signal from an accelerator pedal position sensor (not shown) or the like, and also set an opening of a throttle valve 10 (intake air quantity) and a fuel injection time $\tau$ (fuel injection quantity) of each injector 12 in accordance with the target torque and the target air-fuel ratio $AF_T$ by using a prepared map or the like (S10).

Along with this, the throttle valve 10 is set at the opening angle as determined in S10, and each injector 12 is opened at a predetermined timing only during the time $\tau$ that is determined at S10.

After the process of S10, ECU 20 monitors a crank angle of the internal combustion engine 1 based upon a signal from the crank angle sensor 14, and obtains an in-cylinder pressure $P(\theta_1)$ in the chamber 3 (chamber 3 as an object), for which the crank angle has reached the predetermined first timing (the timing when crank angle becomes $\theta_1$), at the timing when the crank angle becomes $\theta_1$ based upon a signal from the in-cylinder pressure sensor 15. Further, the ECU 20 calculates a product $P(\theta_1)\cdot V^{\kappa}(\theta_1)$ which is a product of the obtained in-cylinder pressure $P(\theta_1)$ and a value obtained by exponentiating an in-cylinder volume $V(\theta_1)$ at the timing of detecting the in-cylinder pressure $P(\theta_1)$, i.e. at the timing the crank angle becomes $(\theta_1)$ with a specific heat ratio $\kappa$($\kappa$=1.32 in the present embodiment), and stores the calculated product $P(\theta_1)\cdot V^{\kappa}(\theta_1)$ in a predetermined memory region of the RAM (step S12).

It is noted that the first timing is set as an opening timing of the intake valve $V_1$ upon starting an intake stroke or a timing that an exchange of energy in a combustion chamber 3 is assumed to become zero (a timing that a heat generation ratio is assumed to become zero during an intake stroke: $dQ/d\theta=0$). And the value $V^{\kappa}(\theta_1)$ is calculated in advance and stored in the memory device.

After the process of step S12, the ECU 20 obtains an in-cylinder pressure ($\theta_2$) in each combustion chamber 3 based upon a signal from the in-cylinder pressure sensor 15 when the crank angle becomes at a predetermined second timing (timing when the crank angle becomes $\theta_2$). Further, ECU 20 calculates a product $P(\theta_2)\cdot V^{\kappa}(\theta_2)$ which is a product of the obtained in-cylinder pressure $P(\theta_2)$ and a value obtained by exponentiating an in-cylinder volume $V(\theta_2)$ at the timing of detecting the in-cylinder pressure $P(\theta_2)$, i.e. at the timing the crank angle becomes ($\theta_2$) with a specific heat ratio $\kappa$($\kappa$=1.32 in the present embodiment), and stores the calculated control parameter $P(\theta_2)\cdot V^{\kappa}(\theta_2)$ in a predetermined memory region of the RAM (step S14).

It is noted that the second timing is at a closing timing of the intake valve $V_1$ upon terminating the intake stroke. And the value $V^{\kappa}(\theta_2)$ is calculated in advance and stored in the memory device.

As described above, when the control parameters $P(\theta_1)\cdot V^{\kappa}(\theta_1)$ and $P(\theta_2)\cdot V^{\kappa}(\theta_2)$ are obtained, ECU 20 calculates a heat quantity $Q_{air}$ of air aspired into the associated combustion chamber 3 using the above expression (5) as follows, and stores the same in the memory device (S16).

$$Q_{air}=a\times\{P(\theta_2)\cdot V^{\kappa}(\theta_2)-P(\theta_1)\cdot V^{\kappa(\theta_1)}\}$$

Accordingly, by the process from S12 to S16, a heat quantity in the chamber 3 as an object that is calculated regarding the intake stroke, i.e. a heat quantity of air $Q_{air}$ aspired into the corresponding chamber 3, can be calculated easily and quickly, and it is possible to greatly reduce the calculation loads in ECU 20.

After the process of S16, the ECU 20 obtains an in-cylinder pressure ($\theta_3$) in each combustion chamber 3 based upon a signal from the in-cylinder pressure sensor 15 when the crank angle becomes a predetermined third timing (timing when the crank angle becomes $\theta_3$). Further, the ECU 20 calculates a product $P(\theta_3)\cdot V^{\kappa}(\theta_3)$ which is a product of the obtained in-cylinder pressure $P(\theta_3)$ and a value obtained by exponentiating an in-cylinder volume $V(\theta_3)$ at the timing of detecting the in-cylinder pressure $P(\theta_3)$, i.e. at the timing the crank angle becomes ($\theta_3$) with a specific heat ratio $\kappa$($\kappa$=1.32 in the present embodiment), and stores the calculated control parameter $P(\theta_3)\cdot V^{\kappa}(\theta_3)$ in a predetermined memory region of the RAM (step S18).

It is noted that the third timing is determined as spark timing by a spark plug 7, but it may be an arbitrary time point between the closing timing of an intake valve and the spark timing. In addition, the value $V^{\kappa}(\theta_3)$ is calculated in advance and stored in the memory device.

After the process of S18, the ECU 20 obtains an in-cylinder pressure ($\theta_4$) based upon a signal from the in-cylinder pressure sensor 15 when the crank angle becomes at a predetermined fourth timing (timing when the crank angle becomes $\theta_4$). Further, the ECU 20 calculates a product $P(\theta_4)\cdot V^{\kappa}(\theta_4)$ which is a product of the obtained in-cylinder pressure $P(\theta_4)$ and a value obtained by exponentiating an in-cylinder volume $V(\theta_4)$ at the timing of detecting the in-cylinder pressure $P(\theta_4)$, i.e. at the timing the crank angle becomes ($\theta_4$) with a specific heat ratio $\kappa$($\kappa$=1.32 in the present embodiment), and stores the calculated control parameter $P(\theta_4)\cdot V^{\kappa l\ (\theta_4)}$ in a predetermined memory region of the RAM (step S20).

It is noted that the fourth timing is determined as the timing when a combustion is substantially terminated (at a timing that an exchange of energy during an expansion stroke is assumed to become zero, i.e. including the timing that a heat generation ratio is assumed to become zero for a period from expansion stroke to opening timing of an exhaust valve: $dQ/d\theta=0$) And the value $V^{\kappa}(\theta_4)$ is calculated in advance and stored in the memory device.

As described above, when the products $P(\theta_3)\cdot V^{\kappa}(\theta_3)$ and $P(\theta_4)\cdot V^{\kappa}(\theta_4)$ are obtained, ECU 20 calculates a heat generation quantity by combustion of fuel $Q_{fuel}$ provided into the object combustion chamber 3 using the above expression (6) as follows, $$Q_{fuel}=\alpha_F\times\{P(\theta_4)\cdot V^{\kappa}(\theta_4)-P(\theta_3)\cdot V^{\kappa}(\theta_3)\}$$

and stores the same in the predetermined memory region of RAM (S22).

Accordingly, by the process from S18 to S22, a heat quantity in the object chamber 3 that is calculated for a period from combustion start to substantial combustion completion, i.e a heat generation quantity by combustion of fuel $Q_{fuel}$ provided to the corresponding combustion chamber can be calculated easily and quickly, and it is possible to greatly reduce the calculation loads in ECU 20.

Once the process of S22 is completed, ECU 20 calculates, by using the above expression (1), an air-fuel ratio AF of a mixture in the object combustion chamber 3, based upon a heat quantity of air $Q_{air}$ obtained in S16 and a heat generation quantity of fuel $Q_{fuel}$ obtained in S22 (S24).

Accordingly, by calculating a heat quantity of air $Q_{air}$ and a heat generation quantity $Q_{fuel}$ that are the heat quantity in the combustion chamber 3, and by calculating an air-fuel ratio AF, which is a mass ratio of air and fuel in the combustion chamber 3, based upon these heat quantities $Q_{air}$ and $Q_{fuel}$, it is possible to accurately calculate an air-fuel ratio AF for each combustion chamber 3, while reducing the calculation loads to a practicable level.

As an air-fuel ratio AF in the object combustion chamber 3 is calculated in S24, ECU 20 determines whether or not an absolute value of a deviation between the target air-fuel ratio $AF_T$ determined in S10 and the air-fuel ratio AF determined in S24 is greater than a predetermined tolerance $\gamma$, i.e. whether or not the calculated air-fuel ratio AF deviates from the target air-fuel ratio $AF_T$ by more than a specified quantity (S26). When ECU 20 determines that the absolute value of the deviation between the target air-fuel ratio $AF_T$ and the air-fuel ratio AF is greater than the predetermined tolerance $\gamma$, ECU 20 determines a correction quantity of the fuel injection time $\tau$ of the injector 12 according to the deviation between the target air-fuel ration $AF_T$ and the air-fuel ratio AF regarding the object combustion chamber 3 (S28).

Thus, it is possible to control an air fuel ratio highly accurately for each combustion chamber 3 in the internal combustion engine 1, and properly suppress the deviation of the air-fuel ratio AF from the target air-fuel ratio $AF_T$ at certain situation such like a transient period. In addition, in S28, a correction quantity of the opening of throttle valve 10 may be determined, together with, or instead of, the correction quantity of fuel injection time $\tau$.

After the process of S28 is executed, or after the negative determination is made in S26, ECU 20 repeatedly executes the processes of S10 and thereafter.

Figure 7:
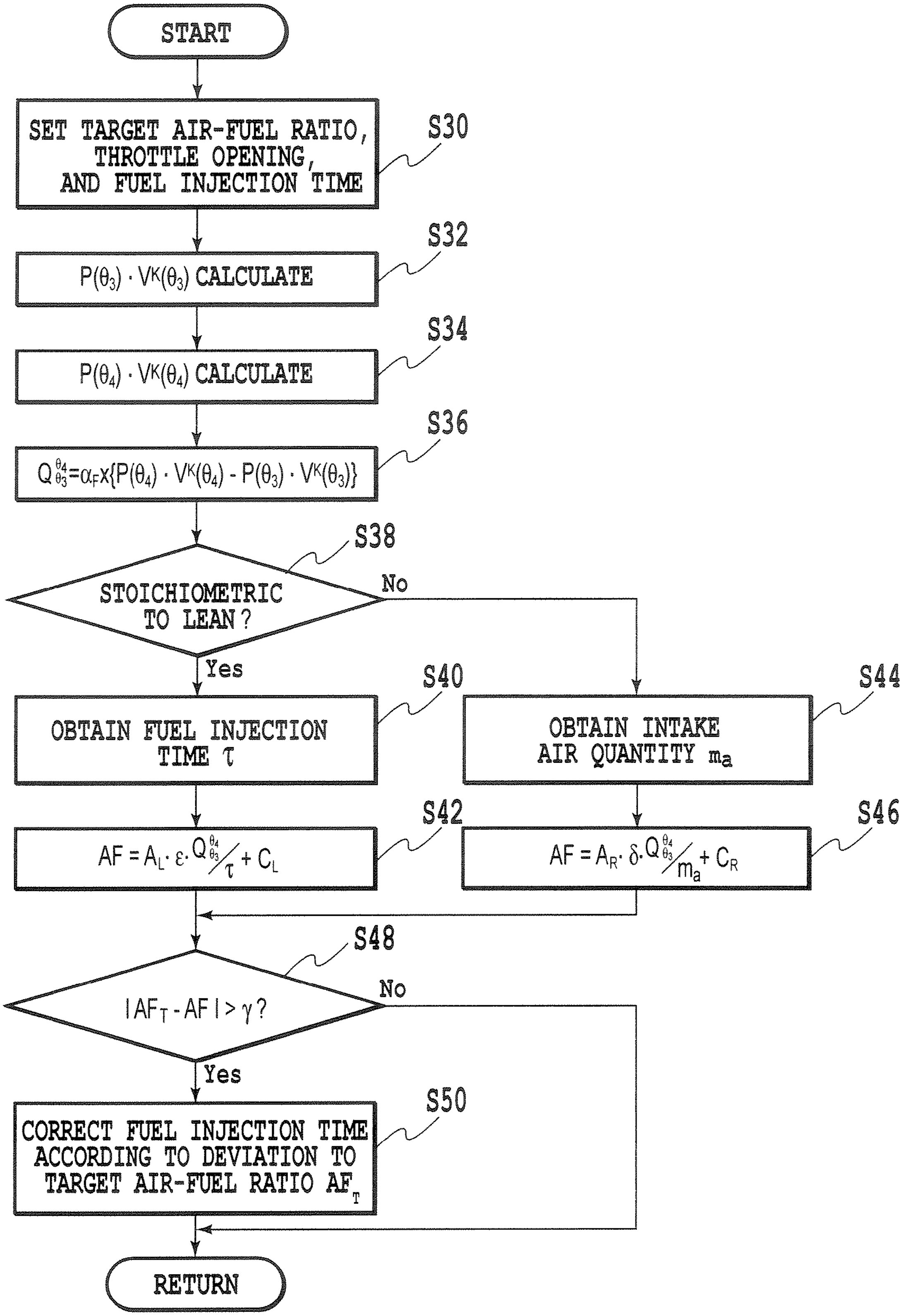
FIG. 7 is a flow chart for explaining another air-fuel ratio routine that may be executed in the internal combustion engine in FIG. 5.

FIG. 7 shows a flow chart for explaining another air-fuel ratio calculation routine that is executed in the above-mentioned internal combustion engine 1.

An air-fuel ratio calculation routine of FIG. 7 is repeatedly executed for each combustion chamber 3. When the routine of FIG. 7 is adopted, as the idling state is shifted to the idling-off state after startup of the internal combustion engine 1, ECU 20 determines a target torque and a target air-fuel ratio $AF_T$ of the internal combustion engine 1 based upon a signal from an accelerator pedal position sensor (not shown) or the like, and also sets an opening of the throttle valve 10 (intake air quantity) and a fuel injection time $\tau$ (fuel injection quantity) of each injector 12 in accordance with the target torque and the target air-fuel ratio $AF_T$ by using a prepared map or the like (S30). Thus, the throttle valve 10 is set at the opening angle as determined in S30, and thereafter, each injector 12 is opened at the predetermined timing only during the time t that is determined in S30, and also the spark by each spark plug 7 is executed at the predetermined timing.

After the processing of S30, ECU 20 monitors a crank angle of the internal combustion engine 1 based upon a signal from the crank angle sensor 14, and obtains an in-cylinder pressure $P(\theta_3)$ in the combustion chamber 3 at a timing when the crank angle becomes $\theta_3$, based upon a signal from the in-cylinder pressure sensor 15. Further, ECU 20 calculates a product $P(\theta_3)\cdot V^{\kappa}(\theta_3)$ which is a product of the obtained in-cylinder pressure $P(\theta_3)$ and a value obtained by exponentiating an in-cylinder volume $V(\theta_3)$ at the timing of detecting the in-cylinder pressure $P(\theta_3)$, i.e. at the timing the crank angle becomes $(\theta_3)$ with a specific heat ratio $\kappa(\kappa=1.32)$, and stores the calculated product $P(\theta_3)\cdot V^{\kappa}(\theta_3)$ in a predetermined memory region of the RAM (step S32). It is noted that the timing when the crank angle becomes $\theta_3$ is, as described above, at a spark timing by the spark plug 7, but it may be an arbitrary time point between closing timing of an intake valve and spark timing In this case, the value $V^{\kappa}(\theta_3)$ is calculated in advance and stored in the memory device.

After the processing of S32, the ECU 20 obtains an in-cylinder pressure $(\theta_4)$ based upon a signal from the in-cylinder pressure sensor 15 at the timing when the crank angle becomes $\theta_4$. Further, the ECU 20 calculates a product $P(\theta_4)\cdot V^{\kappa}(\theta_4)$ which is a product of the obtained in-cylinder pressure $P(\theta_4)$ and a value obtained by exponentiating an in-cylinder volume $V(\theta_4)$ at the timing of detecting the in-cylinder pressure $P(\theta_4)$, i.e. at a timing the crank angle becomes $(\theta_4)$ with a specific heat ratio $\kappa(\kappa=1.32)$, and stores the calculated control parameter $P(\theta_4)\cdot V^{\kappa}(\theta_4)$ in a predetermined memory region of the RAM (step S34). It is noted that the timing when the crank angle becomes $\theta_4$ is, as described above, the timing when a combustion is substantially completed (including a timing that an exchange of energy in a combustion chamber 3 is assumed to become zero during an expansion stroke, i.e. the timing that a heat generation ratio is assumed to become zero for a period from expansion stroke to opening timing of an exhaust valve: $dQ/d\theta=0$). In this case also, the value $V^{\kappa}(\theta_4)$ is calculated in advance and stored in the memory device.

As described above, when the products $P(\theta_3)\cdot V^{\kappa}(\theta_3)$ and $P(\theta_4)\cdot V^{\kappa}(\theta_4)$ are obtained, the ECU 20 calculates an heat generation quantity by combustion of fuel $Q_{fuel}$ provided into the object combustion chamber 3 using the above expression (6) as $\alpha_F\times\{P(\theta_4)\cdot V^{\kappa}(\theta_4)-P(\theta_3)\cdot V^{\kappa}(\theta_3)\}$, and stores the same in a predetermined memory region of RAM (S36). Accordingly, by the processes from S32 to S36, a heat quantity in the object chamber 3 that is calculated for a period from combustion start to substantial combustion completion, i.e. a heat generation quantity by combustion of fuel $Q_{fuel}$ provided to the object combustion chamber, can be calculated easily and quickly, and it is possible to greatly reduce the calculation loads in ECU 20.

After the process of S36 is completed, ECU 20 determines which operation mode the internal combustion engine 1 should be operated in accordance to (S38). The internal combustion engine 1 in the present embodiment may be operated under either a stoichiometric operation mode that sets an air-fuel ratio of a fuel-air mixture in each combustion chamber 3 to the theoretical air-fuel ratio(fuel:air=1:14.7), or a lean operation mode that sets an air-fuel ratio of a mixture in each combustion chamber 3 to a desired target air-fuel ratio which is greater than the theoretical air-fuel ratio, or a rich operation mode that sets an air-fuel ratio of a mixture in each combustion chamber 3 to the desired target air-fuel ratio which is smaller than the theoretical air-fuel ratio. Also, ECU 20 determines in S38 whether it should operate a stoichiometric operation mode or a lean operation mode based upon the parameters, such as revolutions, loads, throttle opening, or depressing acceleration of the accelerator pedal.

When ECU 20 determines to operate either a stoichiometric operation mode or a lean operation mode, ECU 20 reads out the fuel injection time $\tau$ determined in S30 (S40), and then, using the above expression (2), it calculates an air-fuel ratio AF of a mixture in the object combustion chamber 3, based on the corresponding fuel injection time t and the heat generation quantity $Q_{fuel}$ calculated in S36 (S42). On the other hand, when ECU 20 determines in S38 that it should execute a rich operation mode, ECU 20 obtains an intake air quantity $M_a$ toward the object combustion chamber 3 for a period between opening of the intake valve $V_1$ and closing thereof, which is calculated based upon the detected value of an air flow meter AFM (S44), and also ECU 20 calculates, using the above expression (3), an air fuel ratio AF of a mixture in the corresponding combustion chamber 3 based upon the corresponding intake air quantity and the heat generation quantity of fuel $Q_{fuel}$ calculated in S36 (S46).

Accordingly, by using the correlation between a heat generation quantity by combustion of fuel $Q_{fuel}$ provided to a combustion chamber 3 and an air-fuel ratio of a mixture in a combustion chamber 3 (refer to FIG. 1) and by using the expression (2) for a lean zone and the expression (3) for a rich zone that are obtained by normalizing a heat generation quantity of fuel $Q_{fuel}$ in each of the lean zone and the rich zone, it is possible to accurately calculate an air-fuel ratio AF for each combustion chamber 3 in each of the lean zone and the rich zone, while reducing the calculation loads to a practical level.

In addition, by using the above expressions (2) and (3), it is possible to furthermore reduce the calculation loads upon calculating the air-fuel ratio AF, since only a heat generation quantity of fuel $Q_{fuel}$ needs to be calculated but not a heat quantity of air $Q_{air}$. In addition, an air-fuel ratio AF when the stoichiometric operation mode is executed may be calculated in S46 that uses the above expression (3).

As an air-fuel ratio AF in the object combustion chamber 3 is calculated in S42 or S46, ECU 20 determines whether or not the absolute value of the deviation between the target air-fuel ratio $AF_T$ determined in S30 and the air-fuel ratio AF determined in S42 or S46 is greater than a predetermined tolerance $\gamma$, i.e. whether or not the calculated air-fuel ratio AF deviates from the target air-fuel ratio $AF_T$ by more than a predetermined quantity (S48). Once ECU 20 determines in S48 that the absolute value of the deviation between the target air-fuel ratio $AF_T$ and the air-fuel ratio AF is greater than the predetermined tolerance $\gamma$, it determines a correction quantity of the fuel injection time $\tau$ of the injector 12 according to the deviation between the target air-fuel ration $AF_T$ and the air-fuel ratio AF regarding the object combustion chamber 3 (S50).

Thus, it is possible to control an air fuel ratio accurately for each combustion chamber 3 when the routine in FIG. 7 is executed, suppressing the deviation of the air-fuel ratio AF from the target air-fuel ratio $AF_T$ at certain situation such like a transient period. In addition, in S50, the correction quantity of the opening of throttle valve 10 may be determined, together with, or instead of, the correction quantity of fuel injection time τ.

After the S50 processing is executed, or after the negative determination is made in S48, ECU 20 repeatedly executes the processes of S30 and thereafter.

INDUSTRIAL APPLICABILITY

The present invention is useful in detecting an air-fuel ratio in a combustion chamber accurately.

The invention claimed is:

1. A control apparatus for an internal combustion engine which generates power by burning a mixture of fuel and air in a combustion chamber comprising:

in-cylinder pressure detecting means for detecting an in-cylinder pressure in a combustion chamber;

in-cylinder energy calculating means for calculating a heat quantity in the combustion chamber based upon the in-cylinder pressure detected by the in-cylinder pressure detecting means; and air-fuel ratio determining means for determining an air-fuel ratio in the combustion chamber based upon the heat quantity calculated by the in-cylinder energy calculating means, wherein:

the in-cylinder energy calculating means calculates a heat quantity of air aspired into the combustion chamber and a heat generation quantity by combustion of fuel provided to the combustion chamber; and the air-fuel ratio determining means determines an air-fuel ratio in the combustion chamber based upon the heat quantity of the air and the heat generation quantity of the fuel calculated by the in-cylinder energy calculating means.

2. A control apparatus for an internal combustion engine as defined by claim 1, wherein:

the in-cylinder energy calculating means calculates the heat quantity based upon the in-cylinder pressure detected by the in-cylinder pressure detecting means and an in-cylinder volume at the time of detecting the in-cylinder pressure.

3. A control apparatus for an internal combustion engine as defined by claim 1, wherein:

the in-cylinder energy calculating means calculates the heat quantity based upon a product of the in-cylinder pressure detected by the in-cylinder pressure detecting means and a value made by an in-cylinder volume at the time of detecting the in-cylinder pressure raised to a predetermined exponent.

4. A control apparatus for an internal combustion engine as defined by claim 1, wherein:

the in-cylinder energy calculating means calculates the heat quantity of the air based upon a deviation between two prescribed points during an intake stroke for a product of the in-cylinder pressure detected by the in-cylinder detecting means and a value made by the in-cylinder volume at detecting timing of the in-cylinder pressure raised to a predetermined exponent.

5. A control apparatus for an internal combustion engine as defined by claim 1, wherein:

the in-cylinder energy calculating means calculates a heat generation quantity of fuel based upon a deviation between two prescribed points within a period from combustion start to substantial combustion completion for a product of the in-cylinder pressure detected by the in-cylinder detecting means and a value made by the in-cylinder volume at the detecting timing of the in-cylinder pressure raised to a predetermined exponent.

6. A control apparatus for an internal combustion engine which generates power by burning a mixture of fuel and air in a combustion chamber comprising:

in-cylinder pressure detecting means for detecting an in-cylinder pressure in a combustion chamber;

in-cylinder energy calculating means for calculating a heat quantity in the combustion chamber based upon the in-cylinder pressure detected by the in-cylinder pressure detecting means; and air-fuel ratio determining means for determining an air-fuel ratio in the combustion chamber based upon the heat quantity calculated by the in-cylinder energy calculating means, wherein:

the in-cylinder energy calculating means calculates a heat quantity by combustion of fuel provided to the combustion chamber when an air-fuel ratio in the combustion chamber is set greater than a theoretical air-fuel ratio; and the air-fuel ratio determining means determines the air-fuel ratio in the combustion chamber based upon the heat generation quantity of the fuel calculated by the in-cylinder energy calculating means and a quantity of fuel provided to the combustion chamber.

7. A control apparatus for an internal combustion engine which generates power by burning a mixture of fuel and air in a combustion chamber comprising:

in-cylinder pressure detecting means for detecting an in-cylinder pressure in a combustion chamber;

in-cylinder energy calculating means for calculating a heat quantity in the combustion chamber based upon the in-cylinder pressure detected by the in-cylinder pressure detecting means; and air-fuel ratio determining means for determining an air-fuel ratio in the combustion chamber based upon the heat quantity calculated by the in-cylinder energy calculating means, wherein:

the in-cylinder energy calculating means calculates a heat generation quantity by combustion of fuel provided to the combustion chamber when an air-fuel ratio in the combustion chamber is set smaller than a theoretical air-fuel ratio; and the air-fuel ratio determining means determines an air-fuel ratio in the combustion chamber based upon the heat generation quantity of the fuel calculated by the in-cylinder energy calculating means and a quantity of air aspired into the combustion chamber.

8. A control apparatus for an internal combustion engine according to claim 1, further comprising:

correction means that calculates a predetermined correction value such that an air-fuel ratio calculated by the air-fuel ratio determining means corresponds to a preset target air-fuel ratio.

9. A method for air-fuel ratio calculation for an internal combustion engine having in-cylinder pressure detecting means for detecting an in-cylinder pressure in a combustion chamber, and generating power by burning a mixture of fuel and air in the combustion chamber comprising:

(a) a step for calculating a heat quantity in the combustion chamber based on the in-cylinder pressure detected by the in-cylinder pressure detecting means; and (b) a step for calculating an air-fuel ratio in the combustion chamber based upon the heat quantity calculated in the step (a), wherein:

in the step (a), a heat quantity of air aspired into the combustion chamber and a heat generation quantity by combustion of fuel provided to the combustion chamber are calculated; and in the step (b), an air-fuel ratio in the combustion chamber is determined based upon the heat quantity of the air and the heat generation quantity by combustion of the fuel calculated in the step (a).

10. A method for air-fuel ratio calculation for an internal combustion engine as defined by claim 9, wherein:

in the step (a), the heat quantity is calculated based upon the in-cylinder pressure detected by the in-cylinder detecting means and the in-cylinder volume at the detecting time of the in-cylinder pressure.

11. A method for air-fuel ratio calculation for an internal combustion engine as defined by claim 9, wherein:

in the step (a), the heat quantity is calculated based upon a product of the in-cylinder pressure detected by the in-cylinder pressure detecting means and a value made by the in-cylinder volume at the detecting time of the in-cylinder pressure raised to a predetermined exponent.

12. A method for air-fuel ratio calculation for an internal combustion engine as defined by claim 9, wherein:

in the step (a), the heat quantity of the air is calculated based upon a deviation between two prescribed points within an intake stroke for a product of the in-cylinder pressure detected by the in-cylinder detecting means and a value made by the in-cylinder volume at a detecting timing of the in-cylinder pressure raised to a predetermined exponent.

13. A method for air-fuel ratio calculation for an internal combustion engine as defined by claim 9, wherein:

in the step (a). the heat generation quantity of the fuel is calculated based upon a deviation between two prescribed points within a period from combustion start to substantial combustion completion for a product of the in-cylinder pressure detected by the in-cylinder detecting means and a value made by the in-cylinder volume at the detecting timing of the in-cylinder pressure raised to a predetermined exponent.

14. A method for air-fuel ratio calculation for an internal combustion engine having in-cylinder pressure detecting means for detecting an in-cylinder pressure in a combustion chamber, and generating power by burning a mixture of fuel and air in the combustion chamber comprising:

(a) a step for calculating a heat quantity in the combustion chamber based on the in-cylinder pressure detected by the in-cylinder pressure detecting means; and a step for calculating an air-fuel ratio in the combustion chamber based upon the heat quantity calculated in the step (a), wherein:

when the air-fuel ratio in the combustion chamber is set greater than a theoretical air-fuel ratio, in the step (a) the heat generation quantity by combustion of fuel provided to the combustion chamber is calculated and in the step (b) the air-fuel ratio in the combustion chamber is determined based upon the heat generation quantity by combustion of the fuel calculated in the step (a) and a quantity of the fuel provided to the combustion chamber.

15. A method for air-fuel ratio calculation for an internal combustion engine having in-cylinder pressure detecting means for detecting an in-cylinder pressure in a combustion chamber, and generating power by burning a mixture of fuel and air in the combustion chamber comprising:

(a) a step for calculating a heat quantity in the combustion chamber based on the in-cylinder pressure detected by the in-cylinder pressure detecting means; and a step for calculating an air-fuel ratio in the combustion chamber based upon the heat quantity calculated in the step (a), wherein:

when the air-fuel ratio in the combustion chamber is set smaller than a theoretical air-fuel ratio, in the step (a) the heat generation quantity by combustion of fuel provided to the combustion chamber is calculated and in the step (b) the air-fuel ratio in the combustion chamber is determined based upon the heat generation quantity of the fuel calculated in the step (a) and a quantity of air aspired into the combustion chamber.

* * * * *